(12) United States Patent
Spivey et al.

(10) Patent No.: US 10,993,284 B1
(45) Date of Patent: Apr. 27, 2021

(54) WIRELESS ACCESS POINT FOR INDUSTRIAL AND HAZARDOUS DEPLOYMENTS

(71) Applicant: Cisco Technology, Inc., San Jose, CA (US)

(72) Inventors: Thomas Paul Spivey, Pleasanton, CA (US); Andrew Joseph Lambert, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/742,402

(22) Filed: Jan. 14, 2020

(51) Int. Cl.
*H04W 88/08* (2009.01)
(52) U.S. Cl.
CPC ................................. *H04W 88/08* (2013.01)
(58) Field of Classification Search
CPC ..... H04W 88/08; H05K 5/0217; H05K 5/061; H05K 5/0247; H05K 7/16
See application file for complete search history.

(56) References Cited

U.S. PATENT DOCUMENTS

| | | | |
|---|---|---|---|
| 6,269,521 B1 * | 8/2001 | Gabel | E05D 3/145 16/287 |
| 6,430,038 B1 * | 8/2002 | Helot | G06F 1/1616 248/917 |
| 7,591,046 B2 * | 9/2009 | Zetti | E05D 3/16 16/286 |
| 9,910,465 B2 * | 3/2018 | Tazbaz | G06F 1/1618 |
| 10,082,837 B1 | 9/2018 | Lam et al. | |
| 2019/0327844 A1 * | 10/2019 | Sun | H02M 7/003 |
| 2019/0357373 A1 * | 11/2019 | Tsai | H01R 13/5202 |
| 2020/0317485 A1 * | 10/2020 | Confer | B66F 9/07554 |

* cited by examiner

*Primary Examiner* — Md K Talukder
(74) *Attorney, Agent, or Firm* — Behmke Innovation Group LLC; Kenneth J. Heywood; James J. Wong

(57) ABSTRACT

In one embodiment, a wireless access point is disclosed comprising a housing that defines a compartment and a plurality of apertures configured to receive a plurality of fasteners; a gasket located along a perimeter of the compartment; an access cover for the compartment that defines a plurality of corresponding apertures (that align substantially with the plurality of apertures of the housing); and a hinge coupled to the housing and to the access cover. The hinge includes a first arm affixed to an interior portion of the compartment and extended substantially along a first axis; a second arm connected to the first arm at a first pivot point; a third arm connected to the second arm at a second pivot point; and a fourth arm affixed to an interior portion of the access cover and connected to the third arm at a third pivot point.

8 Claims, 14 Drawing Sheets

WIRELESS ACCESS POINT FOR INDUSTRIAL AND HAZARDOUS DEPLOYMENTS

TECHNICAL FIELD

The present disclosure relates generally to computer networks, and, more particularly, to a wireless access point for industrial and hazardous deployments.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices, while having the ability to communicate with one another, may be required to wirelessly communicate with one or more access points (APs) configured to provide access to the Internet, cloud services, etc. For example, a controller may report to an AP metric information gathered from both an IoT motion sensor and a smart lightbulb, where the IoT motion sensor is configured to actuate lighting in a room when a person enters the room.

Recently, IoT networks have been deployed in industrial environments that may present hazards to the physical hardware of APs. For example, APs that service IoT devices may be deployed on a factory floor, an oil rig, various inclement outdoors environments, etc. Such deployments pose challenges to the resilience and maintenance of AP hardware. For example, an AP may require the prevention of water and/or dust from entering compartments(s) of the AP, while still providing convenient access to port(s) located within the compartment(s).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
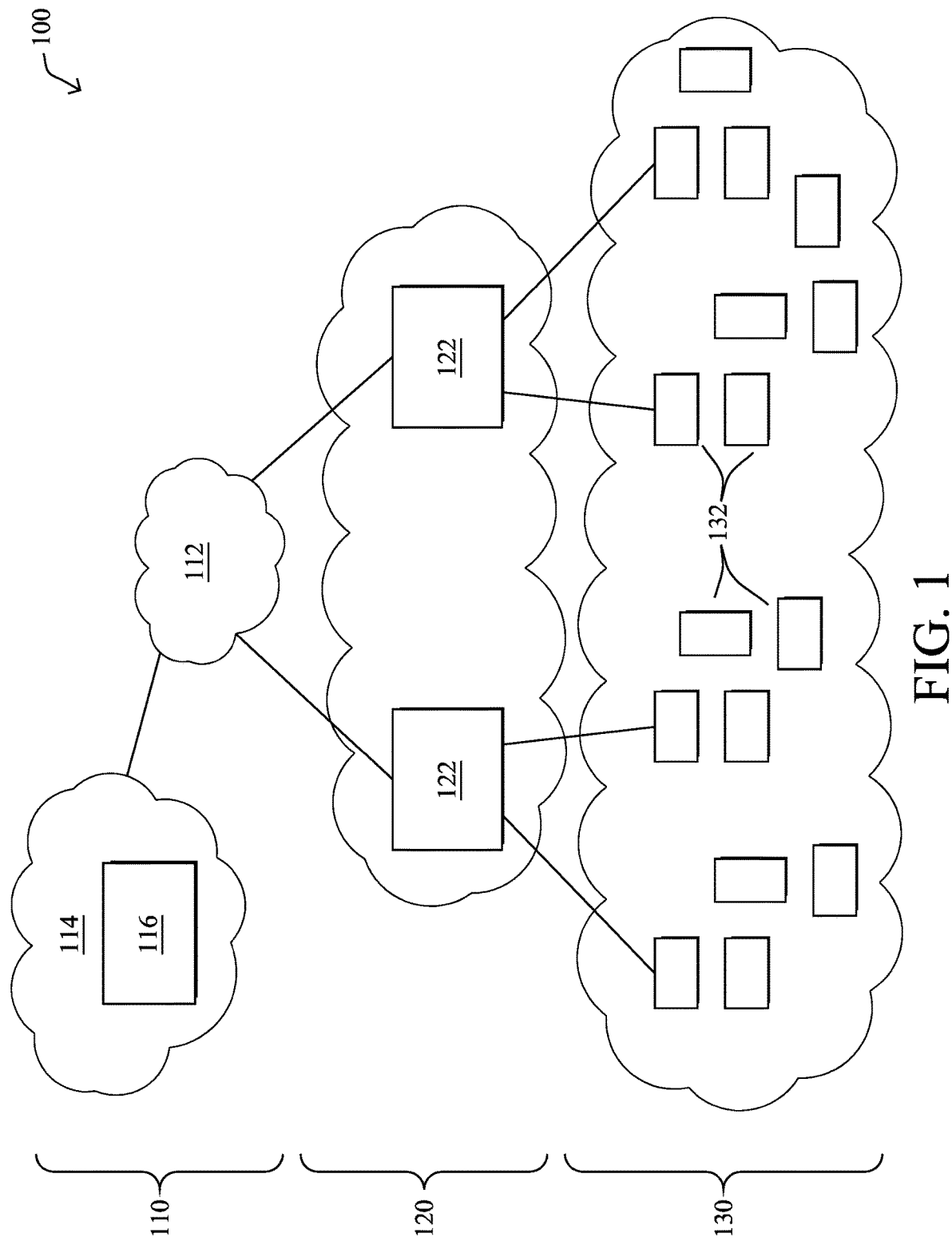
FIG. 1 illustrates an example computer network.

According to one or more embodiments of the disclosure, a wireless access point is disclosed comprising a housing that defines a compartment, the housing further defining a plurality of apertures configured to receive a plurality of fasteners; a gasket located along a perimeter of the compartment; an access cover for the compartment, the access cover defining a plurality of corresponding apertures that align substantially with the plurality of apertures of the housing; and a hinge coupled to the housing and to the access cover. The hinges includes a first arm affixed to an interior portion of the compartment and extended substantially along a first axis, a second arm connected to the first arm at a first pivot point; a third arm connected to the second arm at a second pivot point, and a fourth arm affixed to an interior portion of the access cover and connected to the third arm at a third pivot point. The fourth arm extends substantially along the first axis when the access cover covers the perimeter of the compartment and provides compressive force to the gasket. The fourth arm extends substantially along a second axis when the access cover is in an open position and displaced from the perimeter of the compartment.

According to one or more other embodiments of the disclosure, a method for operating a hinge coupled to a housing of a wireless access point is disclosed. The hinge includes a first arm affixed to an interior portion of a compartment of the housing and extended substantially along a first axis, a second arm connected to the first arm at a first pivot point, a third arm connected to the second arm at a second pivot point, and a fourth arm affixed to an interior portion of an access cover of the wireless access point and connected to the third arm at a third pivot point. The method includes rotating the second arm about the first pivot point and the third arm about the second pivot point such that the second pivot point moves away from the first axis. The method then includes rotating the fourth arm about the first axis such that the fourth arm extends substantially along the first axis. The method then includes translating the third pivot point substantially along the first axis towards the first pivot point such that the access cover provides compressive force to a gasket located along a perimeter of the compartment.

According to one or more other embodiments of the disclosure, a method for operating a hinge coupled to a housing of a wireless access point is disclosed. The hinge includes a first arm affixed to an interior portion of a compartment of the housing and extended substantially along a first axis, a second arm connected to the first arm at a first pivot point, a third arm connected to the second arm at a second pivot point, and a fourth arm affixed to an interior portion of an access cover of the wireless access point and connected to the third arm at a third pivot point. The method includes translating the third pivot point substantially along the first axis away from the first pivot point to remove compressive force the access cover provides to a gasket located along a perimeter of the compartment. The method then includes rotating the fourth arm about the first axis such that the fourth arm is perpendicular to the first axis. The method then includes rotating the second arm about the first pivot point and the third arm about the second pivot point such that the second pivot point moves away from the first axis and towards a second axis that is parallel to the first axis.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, for example, processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several is thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
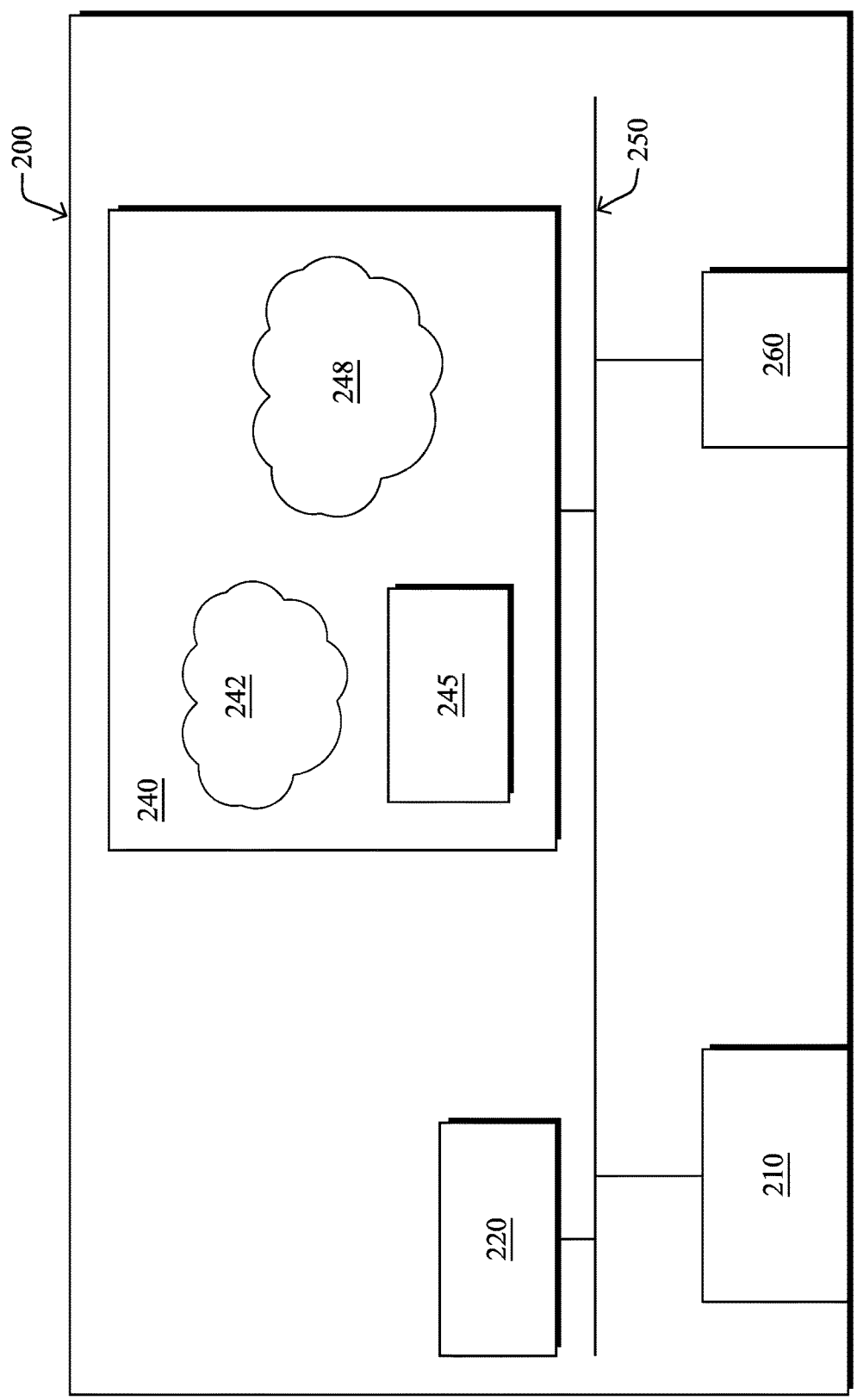
FIG. 2 illustrates an example network device/node.

FIG. 2 is a schematic block diagram of an example node/device 200 that may be used with one or more embodiments described herein, for example, as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data to and/or from a network. For example, the network interface(s) 210 may include a wireless receiver, transmitter, or both (e.g., a transceiver).

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a communication process 248 that offers wireless connectivity services to one or more clients of the example node/device 200, for example, according to one or more wireless protocols as described above.

It will be apparent to those skilled in the art that other processor and memory types, including various computer-readable media, may be used to store and execute program instructions pertaining to the techniques described herein. Also, while the is description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
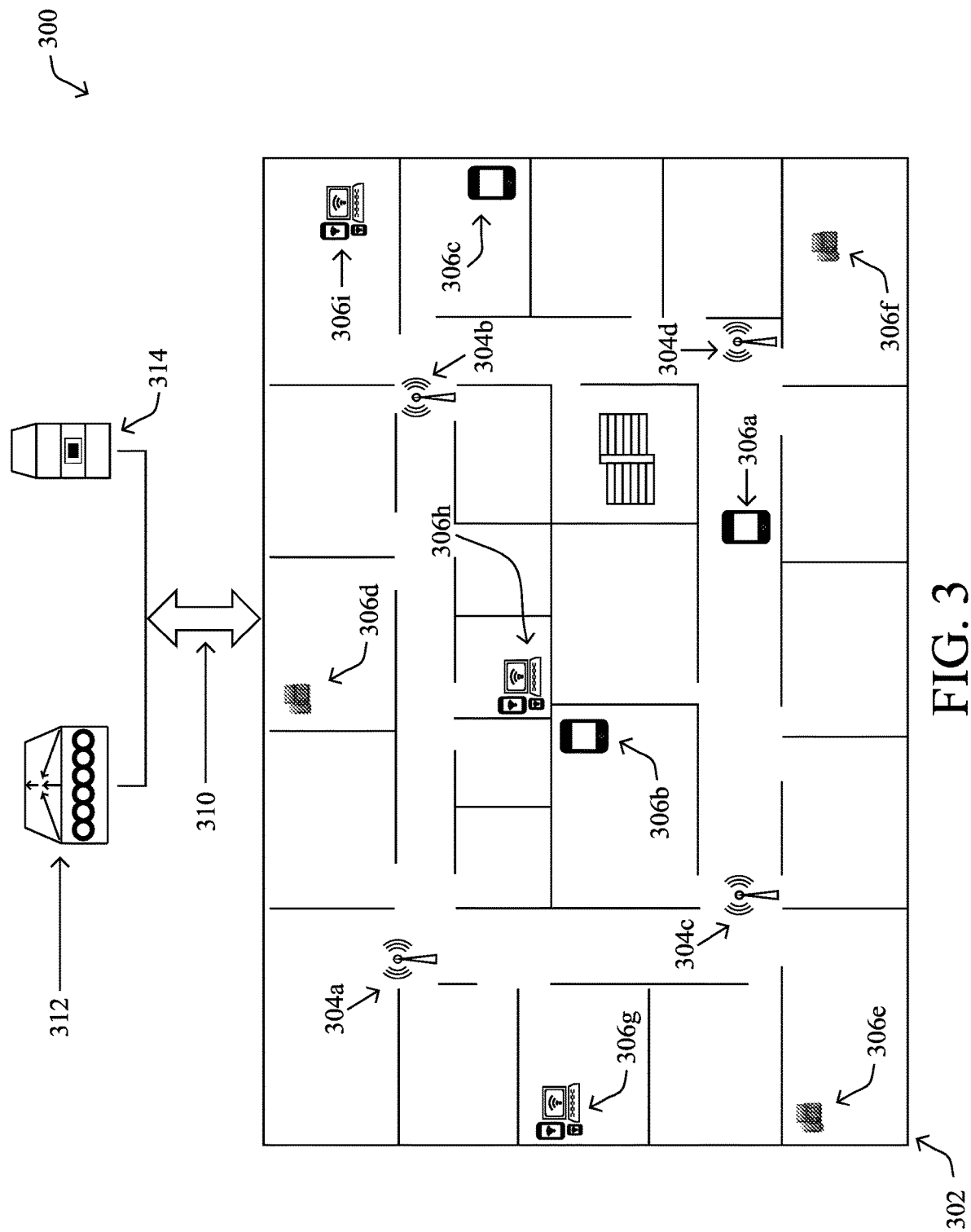
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-304d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.). Note that service 314 may be implemented directly on WLC 312 or may operate in conjunction therewith, in various implementations.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., Wi-Fi, cellular, etc.), as well as any number of networking devices (e.g., routers, switches, etc.).

The types and configurations of clients 306 in network 300 can vary greatly, ranging from powerful computing devices to any number of different types of IoT nodes/devices. For example, clients 306a-306i may include, but are not limited to, wireless sensors, actuators, thermostats, relays, and the like.

As noted above, IoT networks have been increasingly deployed in industrial environments that may present hazards to the physical hardware of APs. For example, APs that service IoT devices may be deployed on a factory floor, an oil rig, various inclement outdoors environments, etc. Such deployments pose challenges to the resilience and maintenance of AP hardware. For example, an AP may require the prevention of water and/or dust from entering compartments(s) of the AP, while still providing convenient access to port(s) located with the compartment(s). To this end, AP housings oftentimes have access covers that may be opened to expose inner compartments and closed to protect the inner compartments from environments that the APs are installed in. The access covers generally are connected to the AP housings with a single pivot hinge. A hinged access cover often leads to a bias on a side from which the access cover is opened due the single pivot point (e.g., one "side" of an AP compartment is exposed initially, opposite the hinge, prior to the other "side" being exposed). This may cause the fasteners (e.g., clamping screws) of the access cover to the housing to cross thread when being used as well as over compression of a gasket (in between the access cover and the housing) along the side where hinge is located, where the over compression leads to corrosion of the gasket over time.

Wireless Access Point for Industrial and Hazardous Deployments

The techniques herein provide a wireless access point for industrial and hazardous deployments. In some embodiments, the techniques herein afford a hinge of a wireless access point housing that provides uniform compression of an access cover to a gasket is located along a perimeter of a compartment of the wireless access point housing. Notably, the uniform compression of the access cover to the compartment prevent dust, water, etc. from entering the compartment (thereby preventing corrosion of the gasket). The hinge may comprise three pivots points and four arms that may be engaged to allow 1.) the access cover to be uniformly lifted off of the gasket (and access point housing) then 2.) pivoted away from the compartment to allow access to ports within the compartment. Further, when the access cover is affixed to the housing using fasteners (e.g., thumb screws), the fasteners may be installed without stripping of the fasteners. The access cover may also be removably coupled to the hinge so as to allow the access cover to be readily removed from the hinge, allowing greater access to the compartment.

Specifically, according to one or more embodiments of the disclosure as described in detail below, a wireless access point is disclosed comprising a housing that defines a compartment, the housing further defining a plurality of apertures configured to receive a plurality of fasteners; a gasket located along a perimeter of the compartment; an access cover for the compartment, the access cover defining a plurality of corresponding apertures that align substantially with the plurality of apertures of the housing; and a hinge coupled to the housing and to the access cover. The hinges includes a first arm affixed to an interior portion of the compartment and extended substantially along a first axis, a second arm connected to the first arm at a first pivot point; a third arm connected to the second arm at a second pivot point, and a fourth arm affixed to an interior portion of the access cover and connected to the third arm at a third pivot point. The fourth arm extends substantially along the first axis when the access cover covers the perimeter of the compartment and provides compressive force to the gasket. The fourth arm extends substantially along a second axis when the access cover is in an open position and displaced from the perimeter of the compartment.

According to one or more other embodiments of the disclosure, a method for operating a hinge coupled to a housing of a wireless access point is disclosed. The hinge includes a first arm affixed to an interior portion of a compartment of the housing and extended substantially along a first axis, a second arm connected to the first arm at a first is pivot point, a third arm connected to the second arm at a second pivot point, and a fourth arm affixed to an interior portion of an access cover of the wireless access point and connected to the third arm at a third pivot point. The method includes rotating the second arm about the first pivot point and the third arm about the second pivot point such that the second pivot point moves away from the first axis. The method then includes rotating the fourth arm about the first axis such that the fourth arm extends substantially along the first axis. The method then includes translating the third pivot point substantially along the first axis towards the first pivot point such that the access cover provides compressive force to a gasket located along a perimeter of the compartment.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein (e.g., providing wireless connectivity to IoT devices in industrial and/or hazardous environments).

Figure 4A:
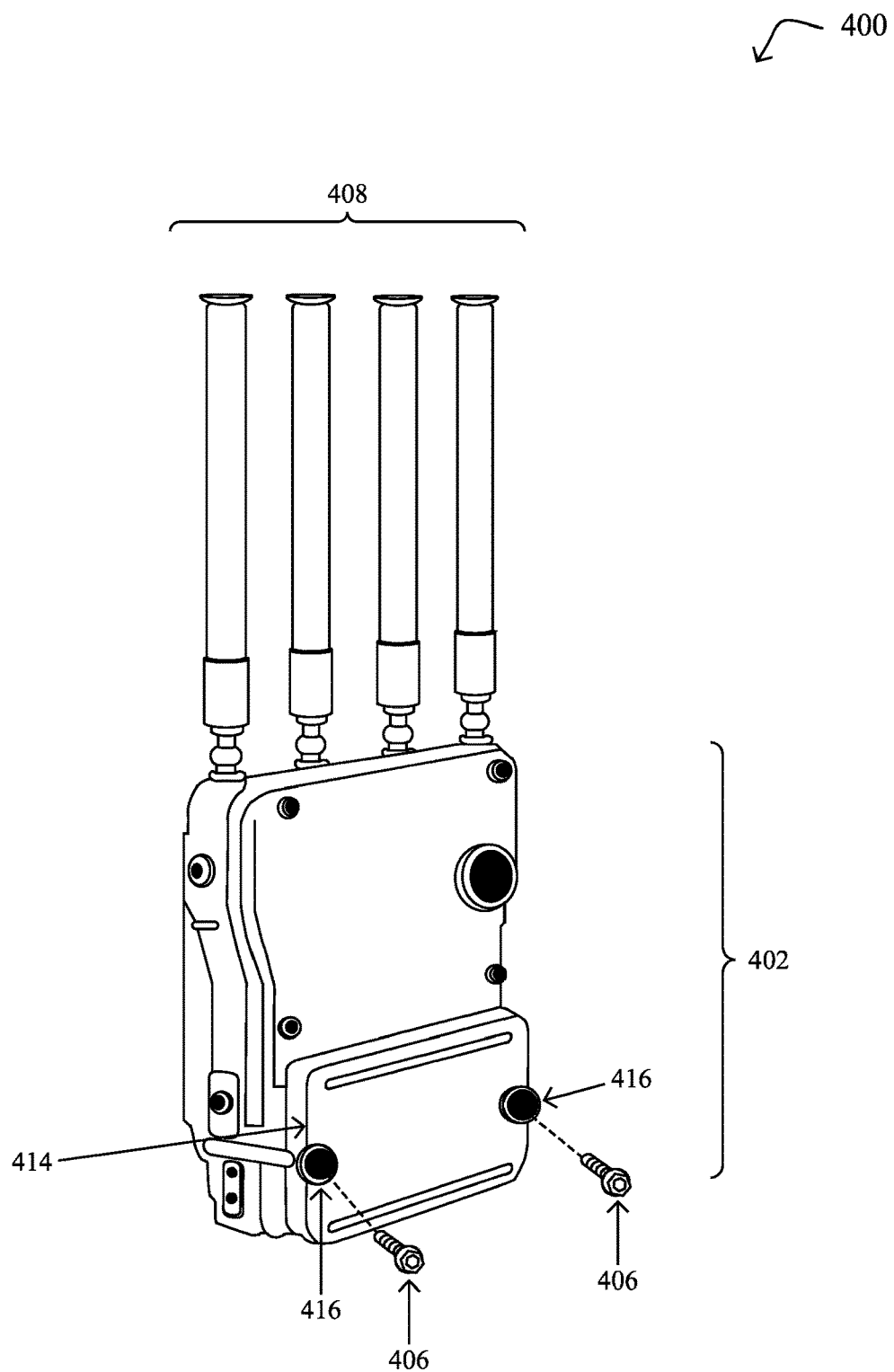
FIGS. 4A-4B illustrate an example wireless access point for industrial and hazardous deployments.
Figure 4B:
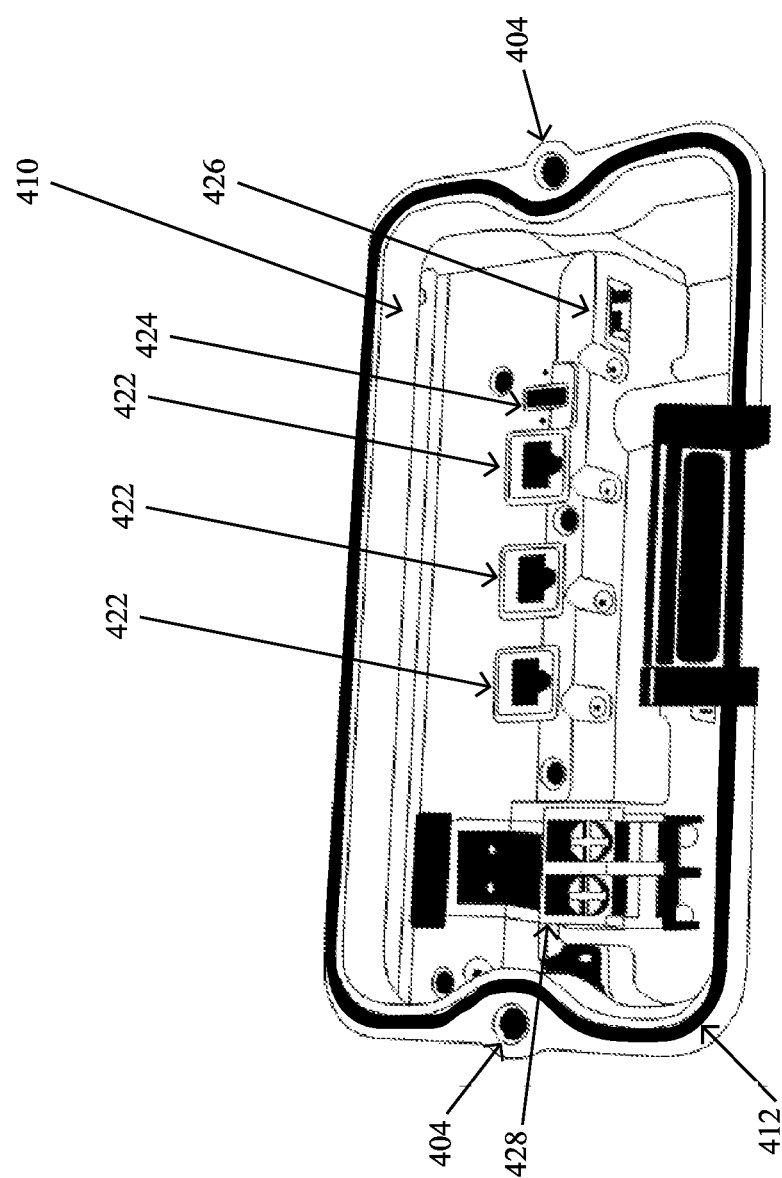

Operationally, FIGS. 4A-4B illustrate an example wireless access point 400 for industrial and hazardous deployments. Generally, the wireless access point 400 may provide wireless connectivity to devices, as described with respect to FIG. 3 (e.g., as any of APs 304). As shown, wireless access point 400 may comprise a housing 402 that defines a compartment 410 (as shown in FIG. 4B) and a plurality of apertures 404 (as shown in FIG. 4B) configured to receive a plurality of fasteners 406. The wireless access point may further comprise a gasket 412 located along a perimeter of the compartment 410 and an access cover 414 for the compartment (as shown in FIG. 4B). The access cover 414 may define a plurality of corresponding apertures 416 that align substantially with the plurality of apertures 404 of the housing 402. A hinge 420 may be coupled to the housing 402 and to the access cover 414, where the hinge may be engaged to open and close the access cover 414 (to, respectively, allow and prevent access to the compartment 410). The wireless access point 400 may further comprise a plurality of antenna 408 affixed to a top portion of the housing 402, where the plurality of antenna 408 are used to facilitate the wireless connectivity. Additionally, the plurality of fasteners 406 may comprise thumb screws insertable through the plurality of apertures 404 of the housing and the plurality of corresponding apertures 416 of the access cover 414 to supply the compressive force to the gasket 412. The access cover 414 may also be removably coupled to the hinge so as to allow the access cover to be readily removed from the hinge.

With reference to FIG. 4B, the compartment 410 of the wireless access point 400 may include a plurality Power of Ethernet (PoE) ports 422, a Universal Serial Bus (USB) port 424, a small form-factor pluggable (SFP) port 426, or a power connector 428. When the access cover 414 covers the perimeter of the compartment 410 and compresses the gasket 412, the compartment 410 may provide at least Ingress Protection 67 (IP67) water and dust resistance.

Figure 5A:
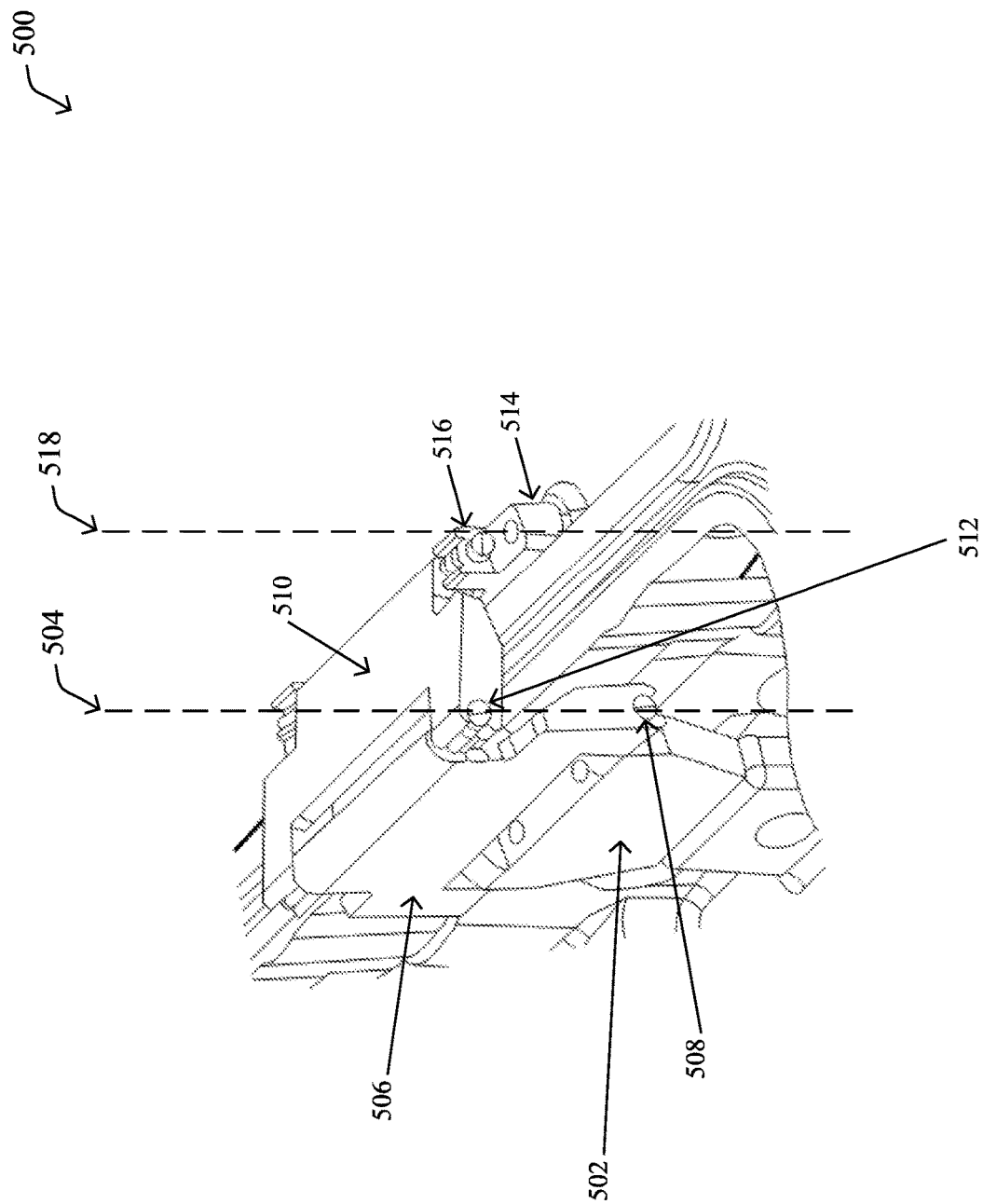
FIGS. 5A-5C illustrate a hinge of an example wireless access point for industrial and hazardous deployments.
Figure 5B:
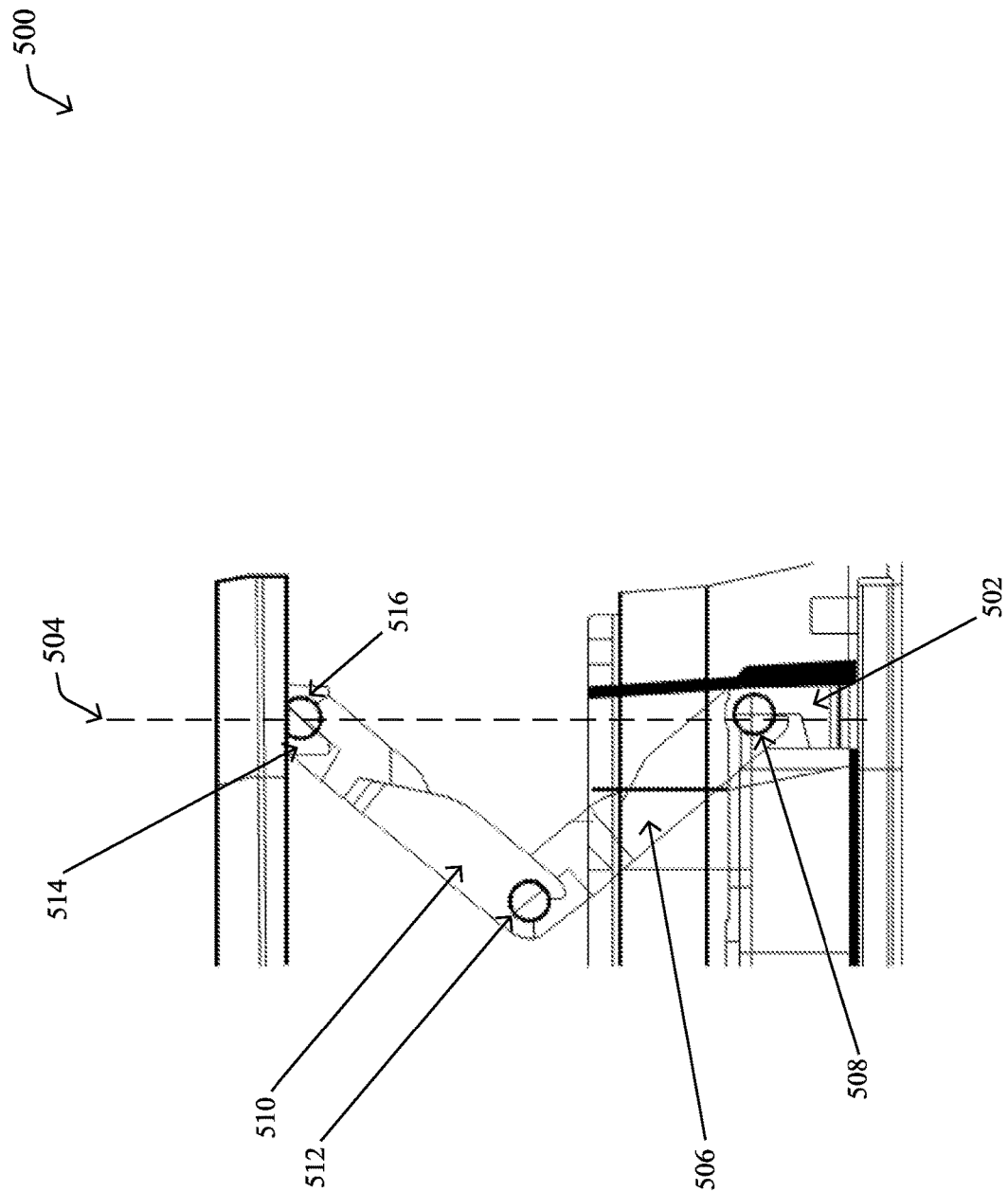
Figure 5C:
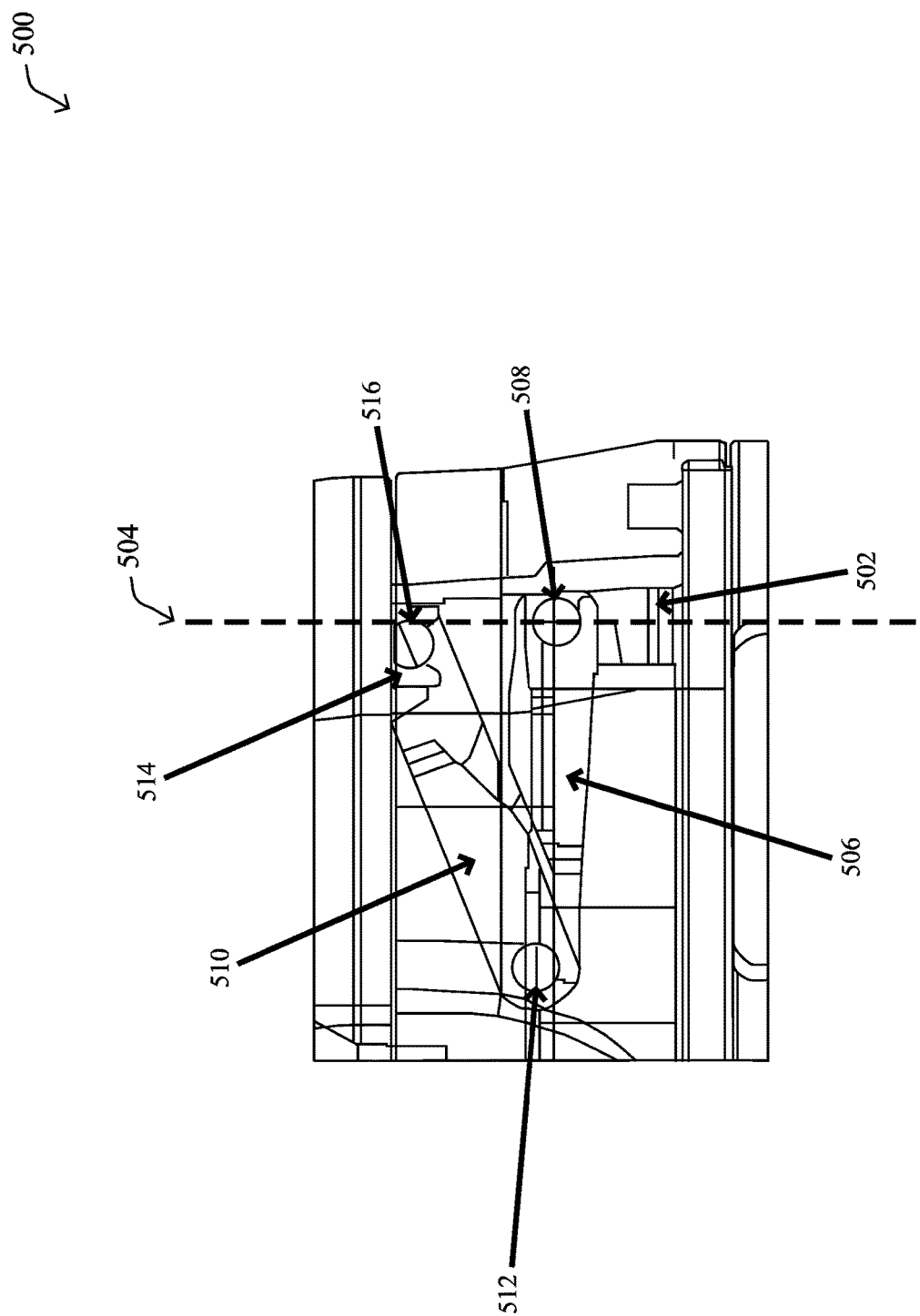

Turning now to FIGS. 5A-5C, a hinge 500 of an example wireless access point for industrial and hazardous deployments is shown. The hinge 500 may couple a housing of the wireless access point to an access cover of the wireless access point. With reference to FIG. 5A, the hinge 500 may include a first arm 502 affixed to an interior portion of the compartment and extended substantially along a first axis 504, a second arm 506 connected to the first arm 502 at a first pivot point 508, a third arm 510 connected to the second arm at a second pivot point 512, and a fourth arm 514 affixed to an interior portion of the access cover and connected to the third arm 510 at a third pivot point 516. As shown, when the access cover is in an open position and displaced from the perimeter of the compartment, the fourth arm 514 extends substantially along a second axis 518. The second arm 506 may be rotated about the first pivot point 508 and the third arm 510 about the second pivot point 512 such that the second pivot point 512 moves away from the first axis 504 (in the opposite direction of the second axis 518).

Turning now to FIG. 5B, the fourth arm 514 may be rotated about the first axis 504 such that the fourth arm 514 extends substantially along the first axis 504. In particular, the third pivot point 516 may be also substantially aligned along the first axis 504, in a position where the access cover is aligned with the compartment of the wireless is access point.

Tuning to FIG. 5C, the third pivot point 516 may be translated substantially along the first axis 504 towards the first pivot point 508 such that the access cover provides compressive force to a gasket located along a perimeter of the compartment (e.g., a closed position). The access cover may be affixed to the housing with a plurality of fasteners (e.g., thumb screws) inserted through a plurality of apertures of the housing and a plurality of corresponding apertures of the access cover to supply the compressive force to the gasket. Notably, the compressive force may be applied substantially uniformly while the fasteners are fastened, thereby preventing cross threading and/or stripping of the fasteners. The compartment provides at least Ingress Protection 67 (IP67) water and dust resistance when the access cover covers the perimeter of the compartment and compresses the gasket.

With reference to FIGS. 6A-6D, operation of a hinge of an example wireless access point 600 for industrial and hazardous deployments (from a closed position to an open position) is shown. Notably, a hinge 602 may be coupled to an access cover 604 and a housing 606 of the wireless access point. In a closed position shown in FIG. 6A, the access cover 604 covers the perimeter of the compartment and provides compressive force to a gasket located along a perimeter of the compartment of the housing. The compressive force prevents, for example, water and dust from entering the compartment. A plurality of fasteners may be used to affix the access cover to the housing.

Figure 6A:
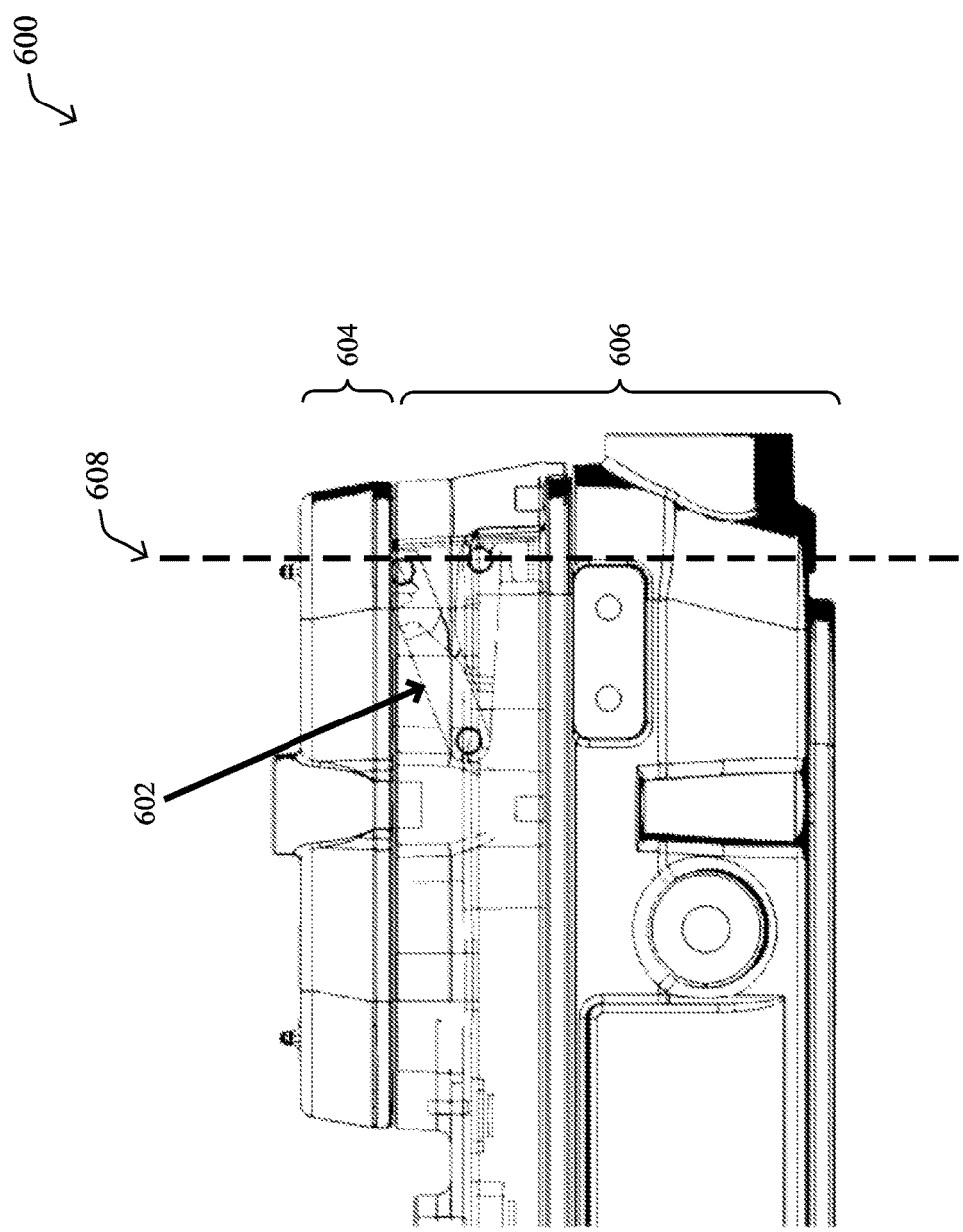
FIGS. 6A-6D illustrate operation of a hinge of an example wireless access point for industrial and hazardous deployments.
Figure 6B:
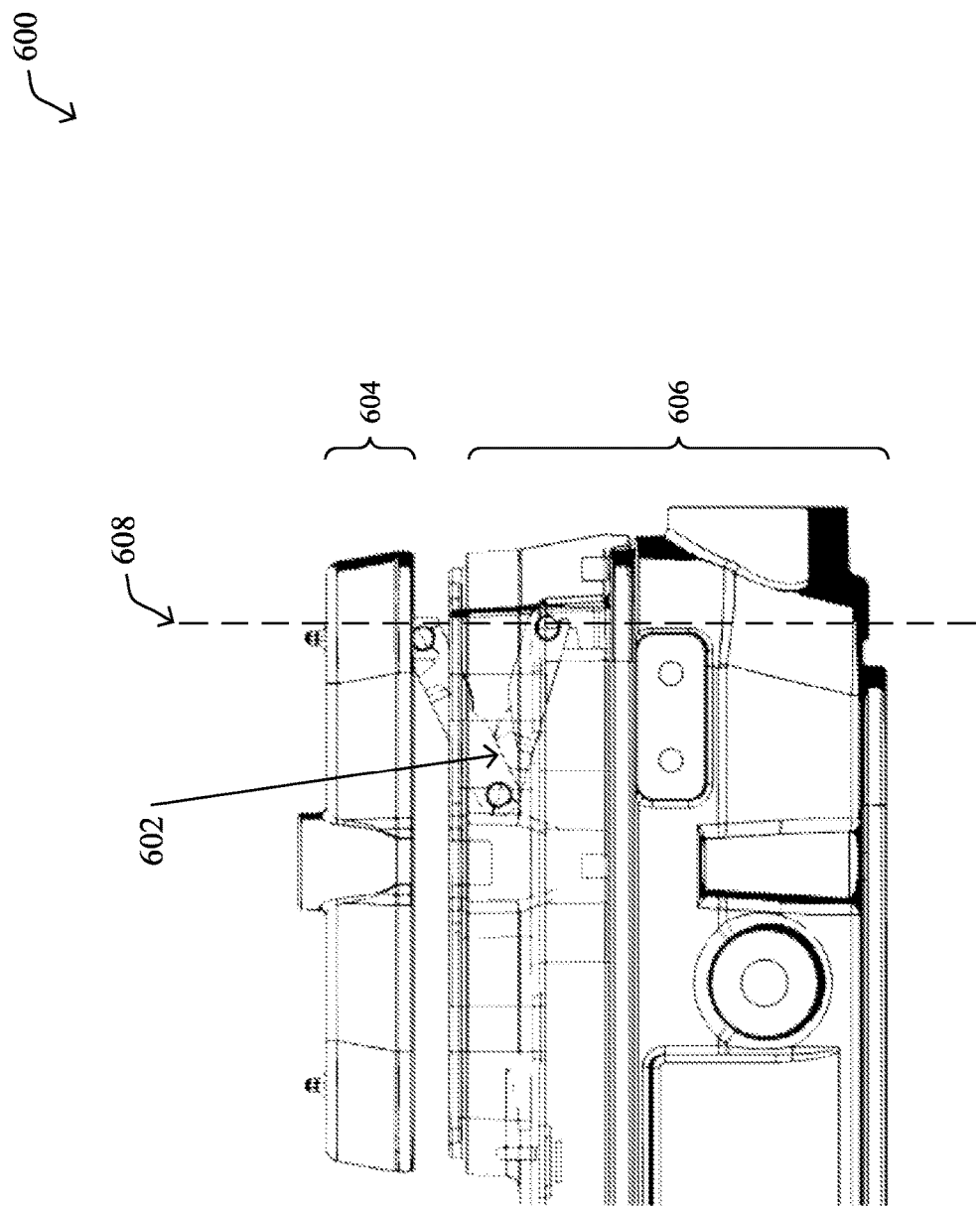
Figure 6C:
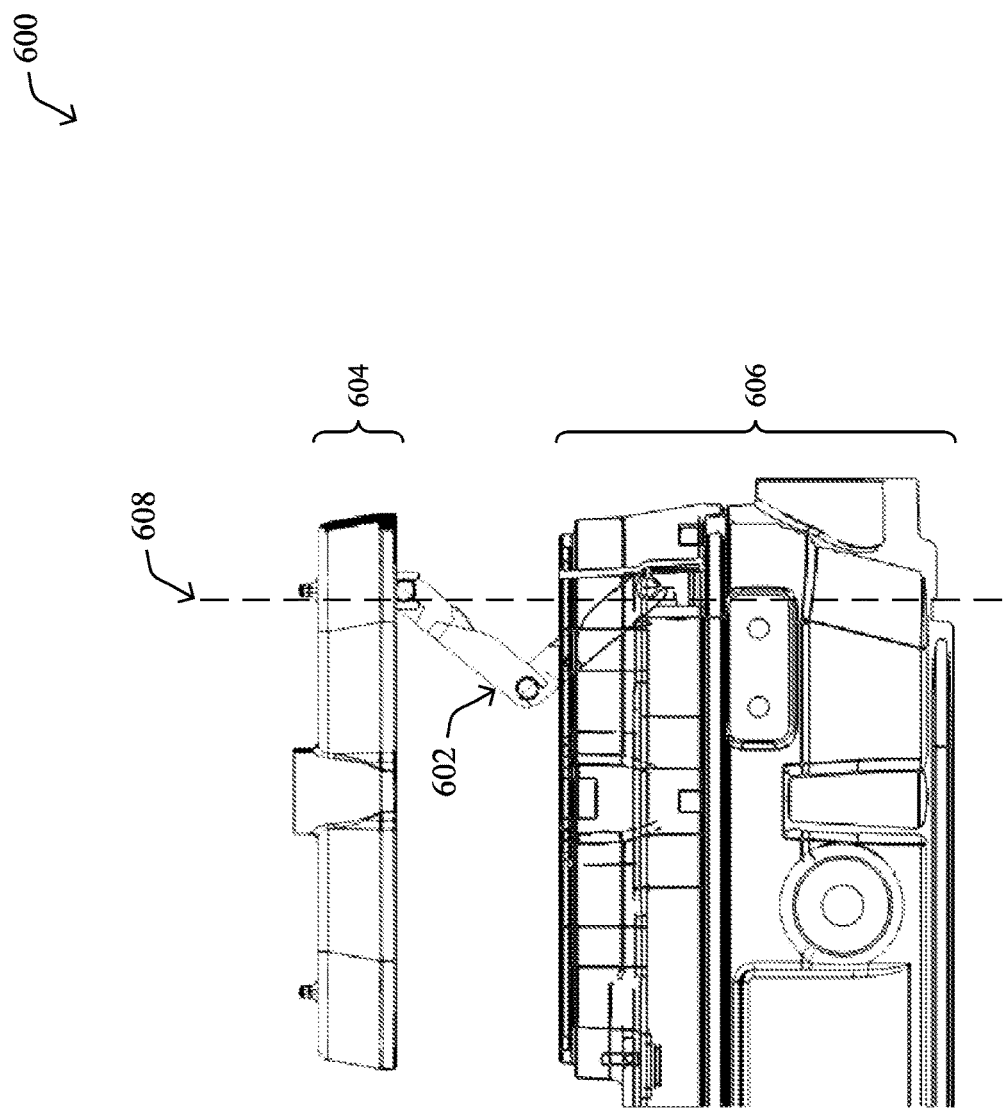

As shown in FIGS. 6B-6C a third pivot point of the hinge 602 may be translated substantially along a first axis 608 away from the first pivot point to remove compressive force the access cover 604 provides to the gasket located along the perimeter of the compartment in the housing 606. When the hinge 602 is in a position as shown in FIG. 6C, a fourth arm may be rotated about a first axis such that the fourth arm is perpendicular to the first axis 608.

Figure 6D:
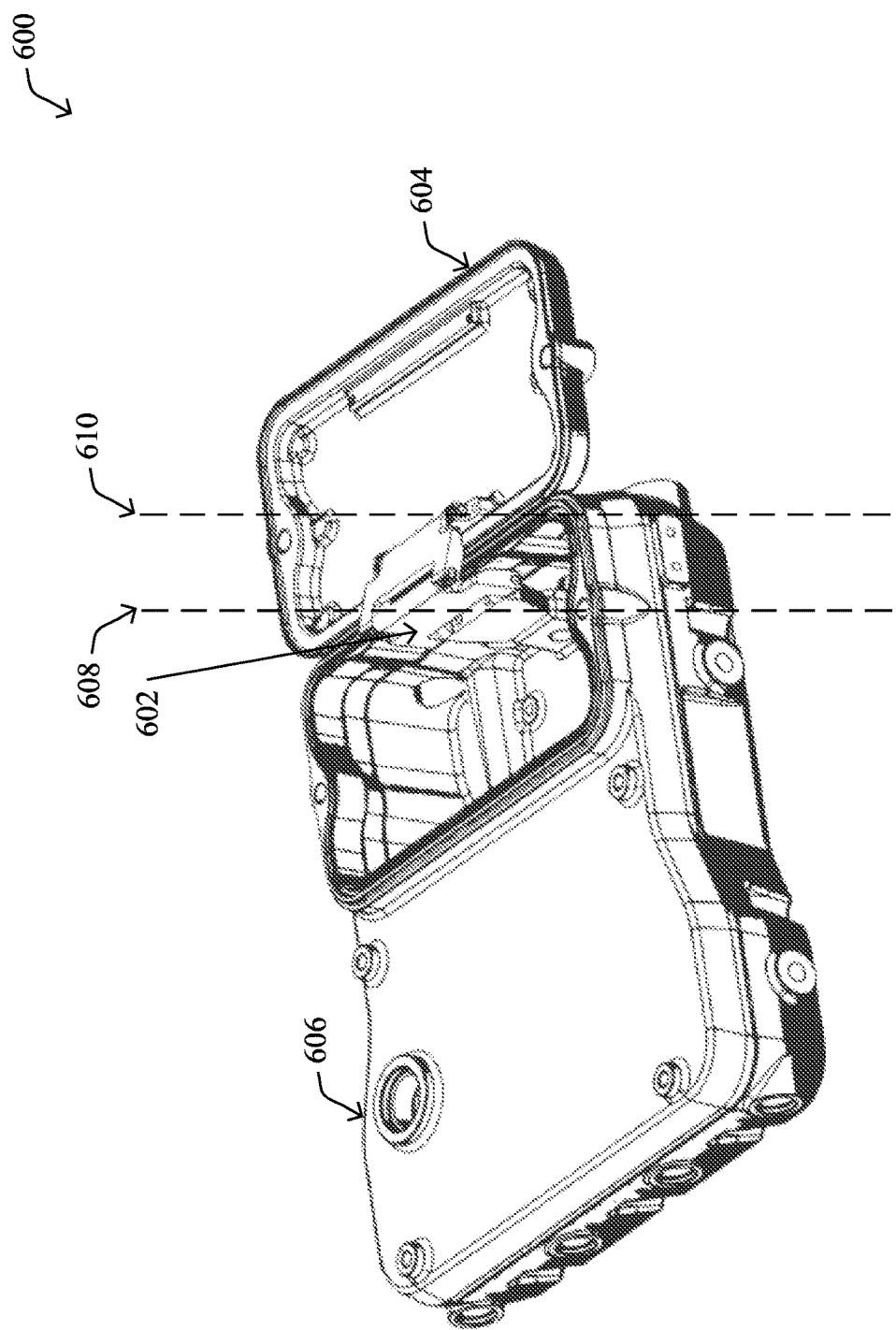

As shown in FIG. 6D, the second arm may be rotated about a first pivot point and the third arm may be rotated about a second pivot point such that the second pivot point moves away from the first axis 608 and towards a second axis 610 that is parallel to the first axis 608, leading to the access cover 604 being in an open position and displaced from the perimeter of the compartment. In some embodiments, the access cover 604 may be removed from the hinge 602 (due to being removably coupled to the hinge 602).

Figure 7:
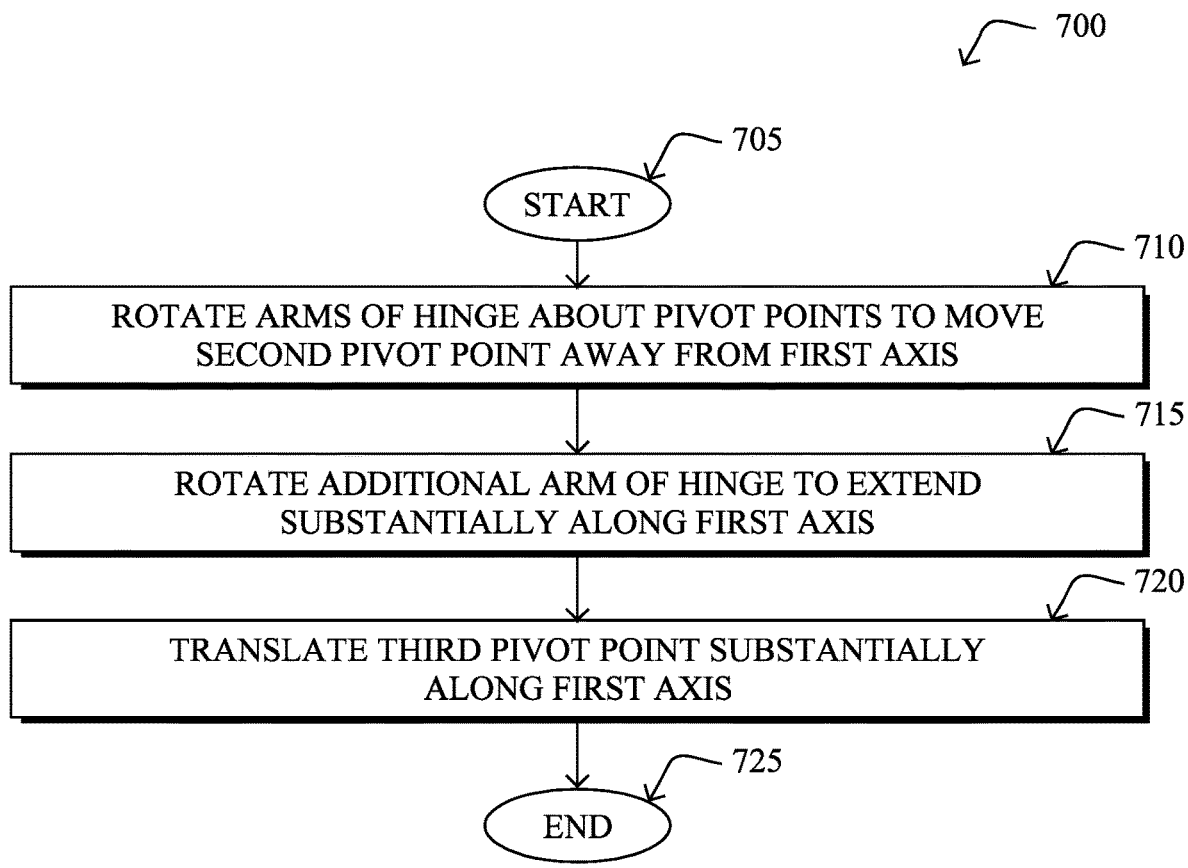
FIGS. 7-8 illustrate simplified procedures for operating a hinge of a wireless is access point for industrial and hazardous deployments.
Figure 8:
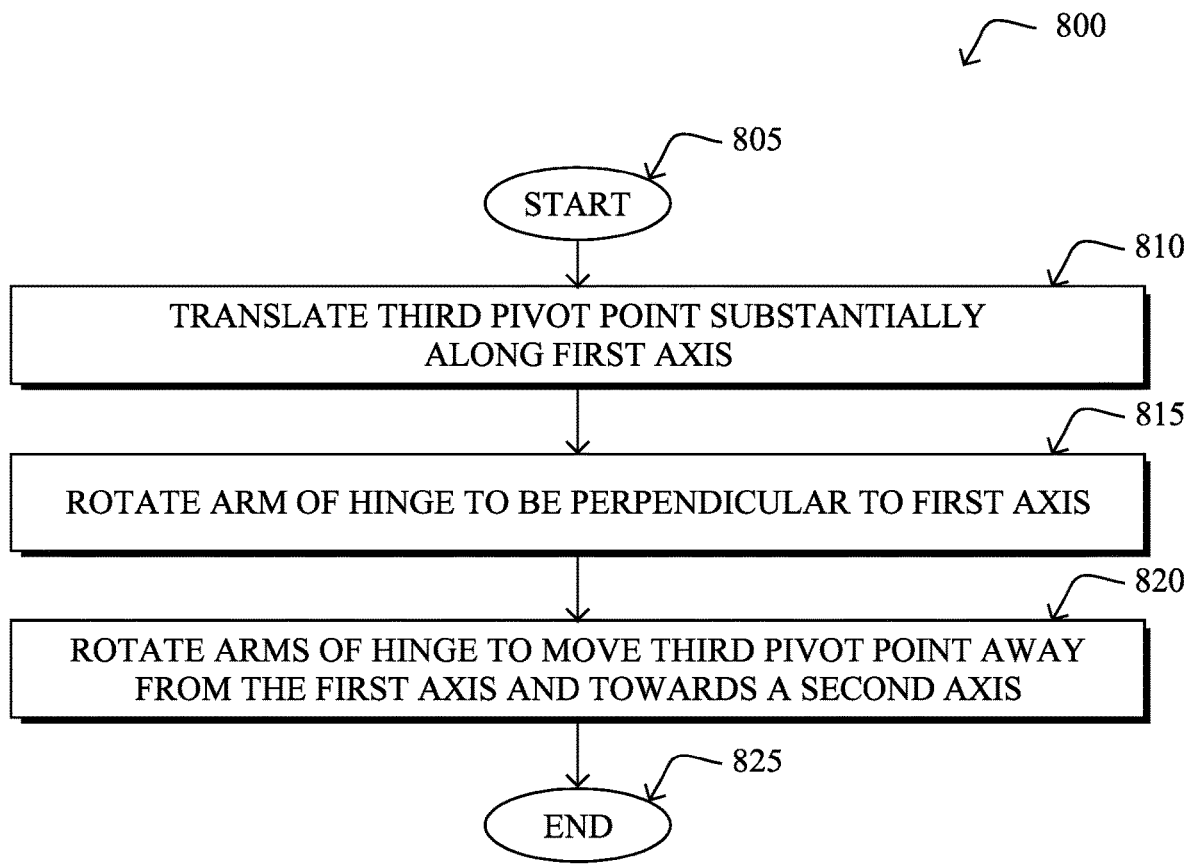

FIGS. 7-8 illustrate example simplified procedure for operating a hinge of a wireless access point for industrial and hazardous deployments, in accordance with one or more embodiments described herein. Procedure 700 may start at step 705 and continue to step 710, where, as described in greater detail above, arms of a hinge may be rotated about pivot points to move a second pivot point away from a first axis. In some embodiments, the hinge may be coupled to a housing of a wireless access point, wherein the hinge includes a first arm affixed to an interior portion of a compartment of the housing and extended substantially along a first axis, a second arm connected to the first arm at a first pivot point, a third arm connected to the second arm at a second pivot point, and a fourth arm affixed to an interior portion of an access cover of the wireless access point and connected to the third arm at a third pivot point. The second arm may be rotated about the first pivot point and the third arm about the second pivot point such that the second pivot point moves away from the first axis. The wireless access point may be installed in an environment with hazardous conditions.

In step 715, as described in greater detail above, an additional arm of the hinge may be rotated to extend substantially along to the first axis. In some embodiments, the fourth arm may be rotated about the first axis such that the fourth arm extends substantially along to the first axis.

In step 720, as described in greater detail above, a third pivot point may be translated substantially along the first axis. In some embodiments, the third pivot point may be translated substantially along the first axis towards the first pivot point such that the access cover provides compressive force to a gasket located along a perimeter of the compartment. The access cover may be affixed to the housing with a plurality of fasteners inserted through a plurality of apertures of the housing and a plurality of corresponding apertures of the access cover to supply the compressive force to the gasket. The compressive force may be applied substantially uniformly while the access cover is is affixed to the housing with the plurality of fasteners. The plurality of fasteners may comprise thumb screws. The compressive force may provide at least Ingress Protection 67 (IP67) water and dust resistance when the access cover provides compressive force to the gasket.

In addition, the third pivot point may be translated substantially along the first axis away from the first pivot point to remove the compressive force the access cover provides to the gasket. The fourth arm may be rotated about the first axis such that the fourth arm is perpendicular to the first axis. The second arm may be rotated about the first pivot point and the third arm about the second pivot point such that the second pivot point moves away from the first axis and towards a second axis that is parallel to the first axis. Procedure 700 then ends at step 725.

Procedure 800 may start at step 805 and continue to step 810, where, as described in greater detail above, a third pivot point may be translated substantially along a first axis. In some embodiments, the hinge may be coupled to a housing of a wireless access point, wherein the hinge includes a first arm affixed to an interior portion of a compartment of the housing and extended substantially along a first axis, a second arm connected to the first arm at a first pivot point, a third arm connected to the second arm at a second pivot point, and a fourth arm affixed to an interior portion of an access cover of the wireless access point and connected to the third arm at a third pivot point. In some embodiments, the third pivot point may be translated substantially along the first axis away from the first pivot point to remove compressive force the access cover provides to a gasket located along a perimeter of the compartment. The compressive force may provide at least Ingress Protection 67 (IP67) water and dust resistance when the access cover provides compressive force to the gasket.

In step 815, as described in greater detail above, an arm of a hinge may be rotated to be perpendicular to first axis. In some embodiments, the fourth arm may be rotated about the first axis such that the fourth arm is perpendicular to the first axis.

In step 820, as described in greater detail above, arms of hinge may be rotated to is move the third pivot point away from the first axis and towards a second axis. In some embodiments, the second arm may be rotated about the first pivot point and the third arm about the second pivot point such that the second pivot point moves away from the first axis and towards a second axis that is parallel to the first axis. In addition, the access cover may be detached from the housing by removing a plurality of fasteners inserted through a plurality of apertures of the housing and a plurality of corresponding apertures of the access cover. The plurality of fasteners may comprise thumb screws. Procedure 800 then ends at step 825.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for a wireless access point for industrial and hazardous deployments that may effectively provide prevention of water and/or dust from entering compartments(s) of the wireless access point, while still providing convenient access to port(s) located with the compartment(s). In particular, a hinge of a wireless access point housing may provide uniform compression of an access cover to a gasket located along a perimeter of a compartment of the wireless access point housing. The uniform compression of the access cover to the access prevents corrosion of the gasket that prevents dust, water, etc. from entering the compartment. Furthermore, when the access cover is affixed to the housing using fasteners (e.g., thumb screws), the fasteners may be installed without stripping of the fasteners. The access cover may also be removably coupled to the hinge so as to allow the access cover to be readily removed from the hinge, allowing greater access to the compartment.

While there have been shown and described illustrative embodiments that provide for a wireless access point, it is to be understood that various other adaptations and modifications may be made within the spirit and scope of the embodiments herein. For example, while exemplary fasteners or ports are shown and described configuration of orthogonal rotational and sliding axes are shown, other fasteners or ports may be used.

The foregoing description has been directed to specific embodiments. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A wireless access point, comprising:
   a housing that defines a compartment, the housing further defining a plurality of apertures configured to receive a plurality of fasteners;
   a gasket located along a perimeter of the compartment;
   an access cover for the compartment, the access cover defining a plurality of corresponding apertures that align substantially with the plurality of apertures of the housing; and
   a hinge coupled to the housing and to the access cover, wherein the hinge includes:
      a first arm affixed to an interior portion of the compartment and extended substantially along a first axis,
      a second arm connected to the first arm at a first pivot point,
      a third arm connected to the second arm at a second pivot point, and
      a fourth arm affixed to an interior portion of the access cover and is connected to the third arm at a third pivot point, wherein the fourth arm extends substantially along the first axis when the access cover covers the perimeter of the compartment and provides compressive force to the gasket, and wherein the fourth arm extends substantially along a second axis when the access cover is in an open position and displaced from the perimeter of the compartment.

2. The wireless access point as in claim 1, wherein the plurality of fasteners comprise thumb screws insertable through the plurality of apertures of the housing and the plurality of corresponding apertures of the access cover to supply the compressive force to the gasket.

3. The wireless access point as in claim 1, further comprising:
   a plurality of antenna affixed to a top portion of the housing.

4. The wireless access point as in claim 1, wherein the compartment comprises at least one of, a Power of Ethernet (PoE) port, a Universal Serial Bus (USB) port, a small form-factor pluggable (SFP) port, or a power connector.

5. The wireless access point as in claim 1, wherein the access cover is removably coupled to the hinge.

6. The wireless access point as in claim 1, wherein the wireless access point provides wireless connectivity.

7. The wireless access point as in claim 1, wherein the compartment provides at least Ingress Protection 67 (IP67) water and dust resistance when the access cover covers the perimeter of the compartment and compresses the gasket.

8. The wireless access point as in claim 1, wherein the compressive force is applied substantially uniformly while the fourth arm extends substantially along the first axis when the access cover covers the perimeter of the compartment.

\* \* \* \* \*

UNITED STATES PATENT AND TRADEMARK OFFICE
CERTIFICATE OF CORRECTION

PATENT NO. : 10,993,284 B1  
APPLICATION NO. : 16/742402  
DATED : April 27, 2021  
INVENTOR(S) : Thomas Paul Spivey et al.

Page 1 of 1

It is certified that error appears in the above-identified patent and that said Letters Patent is hereby corrected as shown below:

In the Specification

Column 1, Line 56, please amend as shown:  
hinge of a wireless access point for industrial and haz- Column 4, Line 23, please amend as shown:  
the order of several thousands to millions of nodes; and Column 6, Line 11, please amend as shown:  
Also, while the description illustrates various processes, it Column 7, Line 30, please amend as shown:  
an access cover to a gasket located along a perimeter of Column 8, Line 7, please amend as shown:  
a first pivot point, a third arm connected to the second arm Column 9, Line 23, please amend as shown:  
is aligned with the compartment of the wireless access Column 10, Line 40, please amend as shown:  
tially uniformly while the access cover is affixed to the Column 11, Line 14, please amend as shown:  
hinge may be rotated to move the third pivot point away In the Claims Column 12, Line 31, Claim 1: please amend as shown:  
cover and connected to the third arm at a third Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*